United States Patent
Horiguchi

(10) Patent No.: US 6,726,589 B2
(45) Date of Patent: Apr. 27, 2004

(54) APPARATUS AND METHOD FOR CONTROLLING OIL PRESSURE OF AN AUTOMATIC TRANSMISSION

(75) Inventor: Masanobu Horiguchi, Atsugi (JP)

(73) Assignee: Unisia Jecs Corporation, Kanagawa-ken (JP)

(*) Notice: Subject to any disclaimer, the term of this patent is extended or adjusted under 35 U.S.C. 154(b) by 0 days.

(21) Appl. No.: 09/928,452

(22) Filed: Aug. 14, 2001

(65) Prior Publication Data

US 2002/0038580 A1 Apr. 4, 2002

(30) Foreign Application Priority Data

Aug. 14, 2000 (JP) .......................... 2000-245567

(51) Int. Cl.⁷ .............................. F16H 31/00
(52) U.S. Cl. ................... 475/116; 475/128; 477/154; 477/155; 477/156; 477/158; 477/174
(58) Field of Search ................. 475/117, 125, 475/127, 128, 116; 477/143, 154, 155, 156, 158, 174, 116, 117

(56) References Cited

U.S. PATENT DOCUMENTS

| 5,086,670 | A | * | 2/1992 | Nitz et al. ............... 477/154 |
| 5,285,880 | A | * | 2/1994 | Minagawa et al. ......... 192/3.58 |
| 5,588,927 | A | * | 12/1996 | Tsukamoto et al. .......... 475/128 |
| 5,665,020 | A | * | 9/1997 | Kamada et al. ............. 475/129 |
| 5,733,220 | A | * | 3/1998 | Iizuka ........................ 477/116 |
| 5,797,821 | A | * | 8/1998 | Fujimoto et al. ........... 475/120 |
| 5,865,708 | A | * | 2/1999 | Nishio et al. ................ 477/155 |
| 5,925,086 | A | * | 7/1999 | Sakai et al. .................. 701/66 |
| 5,938,563 | A | * | 8/1999 | Nishio et al. ................ 477/117 |
| 5,967,942 | A | * | 10/1999 | Yuasa et al. ................. 477/156 |
| 6,149,547 | A | * | 11/2000 | Oba et al. ................... 477/154 |
| 6,216,074 | B1 | * | 4/2001 | Hillman et al. ............... 701/51 |
| 6,371,879 | B1 | * | 4/2002 | Takahagi et al. ............ 475/116 |
| 6,491,604 | B1 | * | 12/2002 | Katou et al. ................ 477/154 |
| 6,569,060 | B2 | * | 5/2003 | Rosi et al. .................. 477/156 |

* cited by examiner

Primary Examiner—Saul Rodriquez
Assistant Examiner—David D. Le
(74) Attorney, Agent, or Firm—Sughrue Mion, PLLC

(57) ABSTRACT

When a different speed change request occurs during pre-charging, an indicated pressure is stepwise changed up to a standby pressure for after pre-charge, and a processing in accordance with the different speed change request is commenced with the indicated pressure after the stepwise change, as an initial pressure.

20 Claims, 14 Drawing Sheets

FIG.4

|   | L/C | L&R/B | 2&4/B | H/C | R/C |
|---|---|---|---|---|---|
| 1 | ○ | ● |   |   |   |
| 2 | ○ |   | ○ |   |   |
| 3 | ○ |   |   | ○ |   |
| 4 |   |   | ○ | ○ |   |
| R |   | ○ |   |   | ○ |

○ ENGAGED
● ENGAGED FOR ONE RANGE

APPARATUS AND METHOD FOR CONTROLLING OIL PRESSURE OF AN AUTOMATIC TRANSMISSION

FIELD OF THE INVENTION

The present invention relates to an apparatus and a method for controlling the supply of oil pressure to a friction engagement element such as a clutch in an automatic transmission.

RELATED ART OF THE INVENTION

Heretofore, in an automatic transmission for a vehicle, there is known a construction where, when engaging a friction engagement element such as a clutch, a pre-charge which is a process for quickly filling oil to the friction engagement element in advance, is performed, to thereby raise the oil pressure of the friction engagement element to that just before engagement (refer to Japanese Unexamined Patent Publication No. 5-106722).

However, there may be a case where, while performing the pre-charge based on a speed change request, a different speed change request is made giving rise to a requirement to conversely release the friction engagement element which was to be engaged by performing the pre-charge.

Heretofore, if as described above a different speed change request is made during pre-charging, an indicated pressure for the pre-charging is gradually reduced.

However during pre-charging, since the actual oil pressure is lower than the indicated pressure due to a oil pressure response delay, even though the indicated pressure is gradually reduced from the time when the different speed change request has occurred, the condition where the actual oil pressure is lower than the indicated pressure is maintained for a while.

In such a condition, the actual oil pressure continues to change upward, and as a result, the friction engagement element not to be engaged starts engagement, so that a speed change shock is likely to occur.

Furthermore, there is a situation where a speed change request occurs during pre-charging, requiring an even more rapid engagement of the friction engagement element.

In this case, the indicated pressure is further increased in a condition where the actual oil pressure is lower than the indicated pressure. Hence, the actual oil pressure is increasingly changed at a speed exceeding the rising speed of the indicated pressure, and due to this abrupt increasing change of the oil pressure, an engagement shock is likely to occur.

SUMMARY OF THE INVENTION

Accordingly, it is an object of the present invention to provide an apparatus and a method for controlling oil pressure, which can avoid the occurrence of a speed change shock when a different speed change request is made during pre-charging.

In order to achieve the above object, the present invention is constructed so that when a different speed change request is made during pre-charging, a processing based on the different speed change request is commenced after a processing has been performed to make an indicated pressure for a friction engagement element being pre-charged approach an actual pressure.

The other objects and features of this invention will become understood from the following description with reference to the accompanying drawings.

BRIEF EXPLANATION OF THE DRAWINGS

FIG. 4 is a diagram showing correlations between combinations of engagement conditions of friction engagement elements and speed change steps.

DESCRIPTION OF THE PREFERRED EMBODIMENTS

Figure 1:
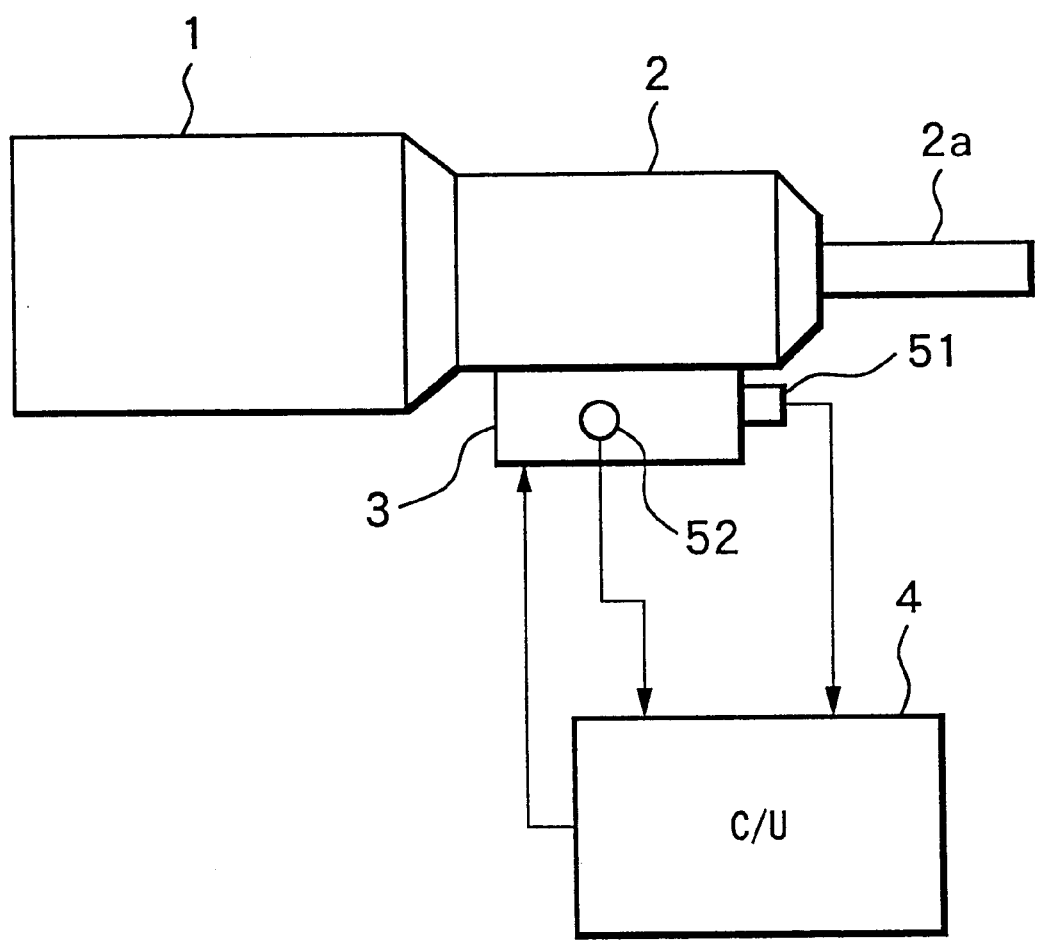
FIG. 1 is a system diagram showing an automatic transmission.

FIG. 1 shows an automatic transmission of a vehicle.

Output torque of an engine 1 mounted on a vehicle is transmitted to drive wheels (not shown in the figure) via an output shaft 2a of an automatic transmission 2.

Automatic transmission 2 is constructed so as to perform speed change by controlling the supply of engagement oil pressure to a friction engagement element such as various clutches and brakes, by means of a solenoid valve unit 3.

According to this embodiment, without using a one-way clutch, the engagement and release of two friction engagement elements is controlled simultaneously with oil pressure to perform the speed change.

Figure 2:
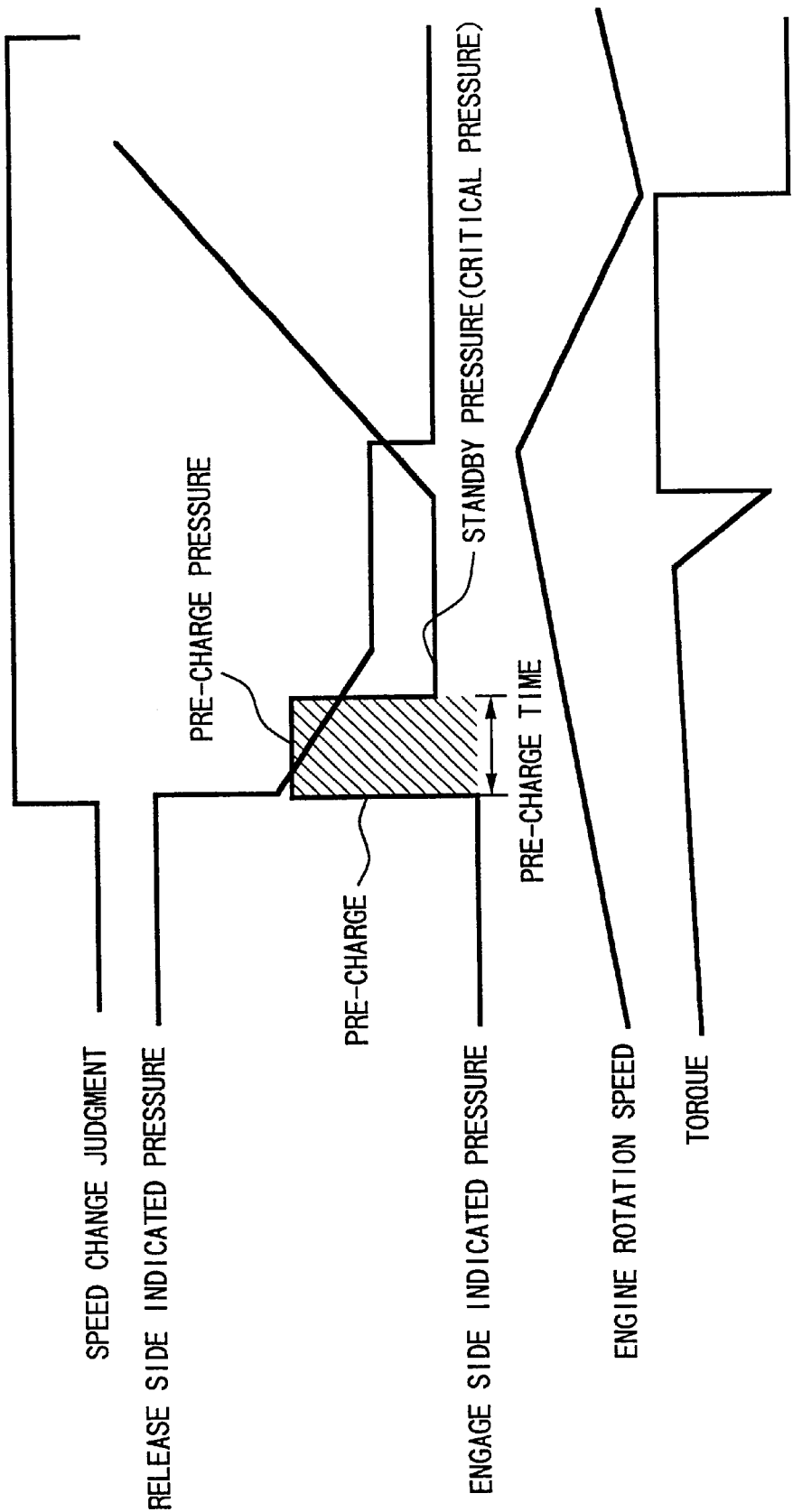
FIG. 2 is a time chart showing a hydraulic control at the time of speed change.

More specifically, as shown in FIG. 2, the engagement oil pressure for the friction engagement elements to be engaged is gradually increased while gradually reducing the engagement oil pressure for the friction engagement elements to be released, thereby shifting torque from the release side friction engagement element to the engage side friction engagement element.

Figure 3:
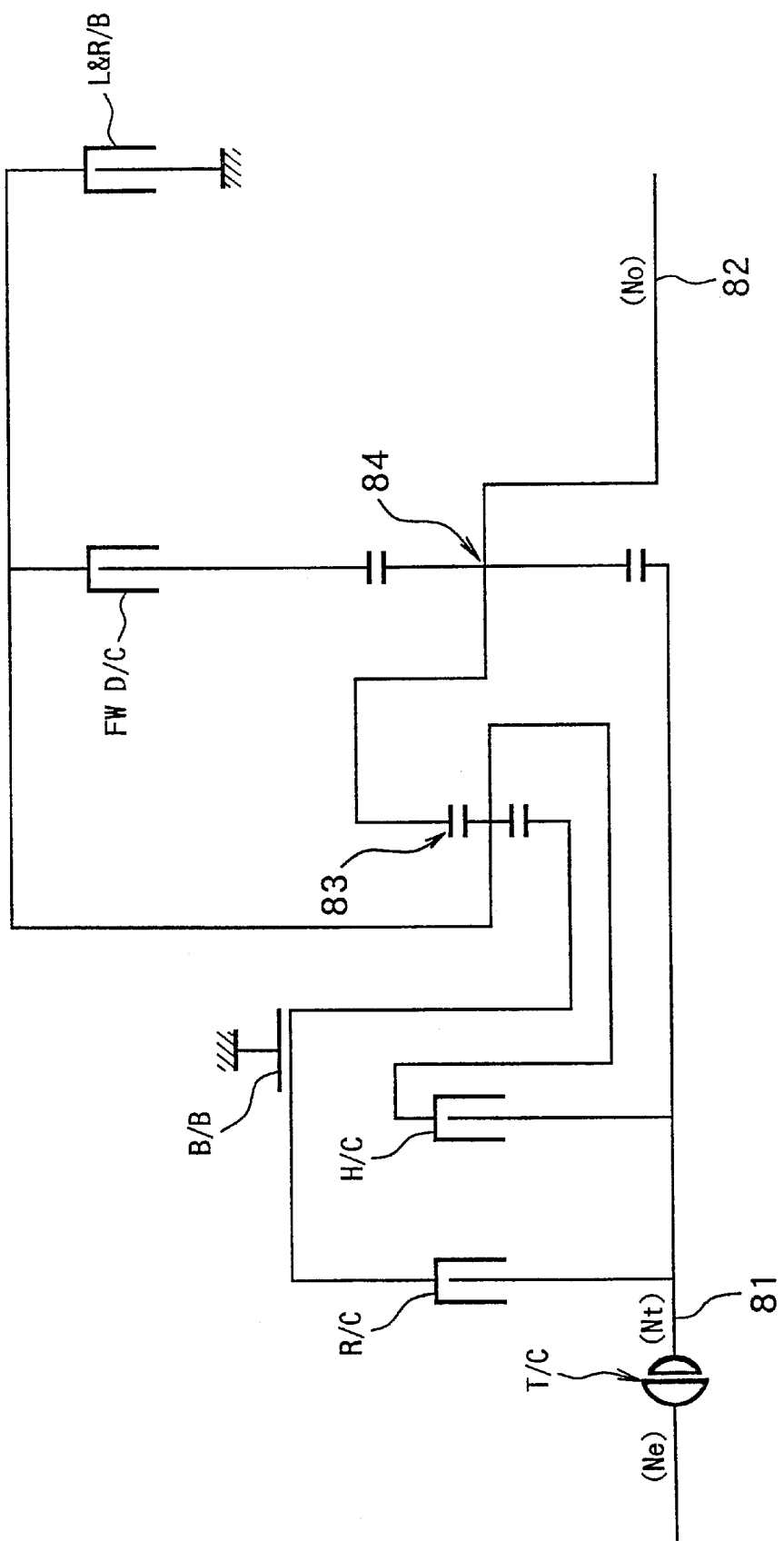
FIG. 3 is a configuration diagram showing details of an automatic transmission.

Automatic transmission 2, as shown in FIG. 3, is configured to be input with the engine output torque via a torque converter T/C, and incorporates a front planetary gear system 83, and a rear planetary gear system 84, and also incorporates, as the friction engagement elements, a reverse clutch R/C, a high clutch H/C, a band brake B/B, a low and reverse brake L & R/B and a forward clutch FWD/C.

In FIG. 3, reference symbol 81 denotes an input shaft of the transmission, reference symbol 82 denotes an output shaft of the transmission, and Ne denotes the engine rotational speed, Nt denotes the turbine rotational speed, and No denotes the output shaft rotational speed.

In this construction, as shown in FIG. 4, speed change is performed in accordance with combinations of engagement and release of the reverse clutch R/C, the high clutch H/C, the band brake B/B, the low and reverse brake L & R/B and the forward clutch FWD/C.

For example, at the time of shifting up from 3-speed to 4-speed, release of the forward clutch FWD/C and engagement of the band brake B/B are performed simultaneously.

The respective solenoid valves of solenoid valve unit 3 are controlled by a control unit 4 incorporating a microcomputer therein.

Here, in engagement control of a friction engagement element such as a clutch, the construction is such that rapid filling of oil (pre-charge) is performed so that a space between a clutch plate and a piston is filled up beforehand.

That is to say, in the case of engaging a friction engagement element such as a clutch, at first by outputting for a predetermined period, a predetermined pre-charge pressure as an indicated pressure for the friction engagement elements to be engaged, the friction engagement elements are stroked without effect until just before engagement, and the indicated pressure is changed stepwise and maintained at a critical pressure (standby pressure) for just before commencing engagement.

After this, the indicated pressure of the engagement side is gradually increased from the critical pressure while matching the timing to a release control, so that the friction engagement element is engaged.

There is a case where a different speed change request (hereunder referred to as a further speed change request) occurs during the aforementioned pre-charge. Aspects of a hydraulic control for the case where this further speed change request has occurred will be explained in accordance with the flow chart of FIG. 5.

Figure 5:
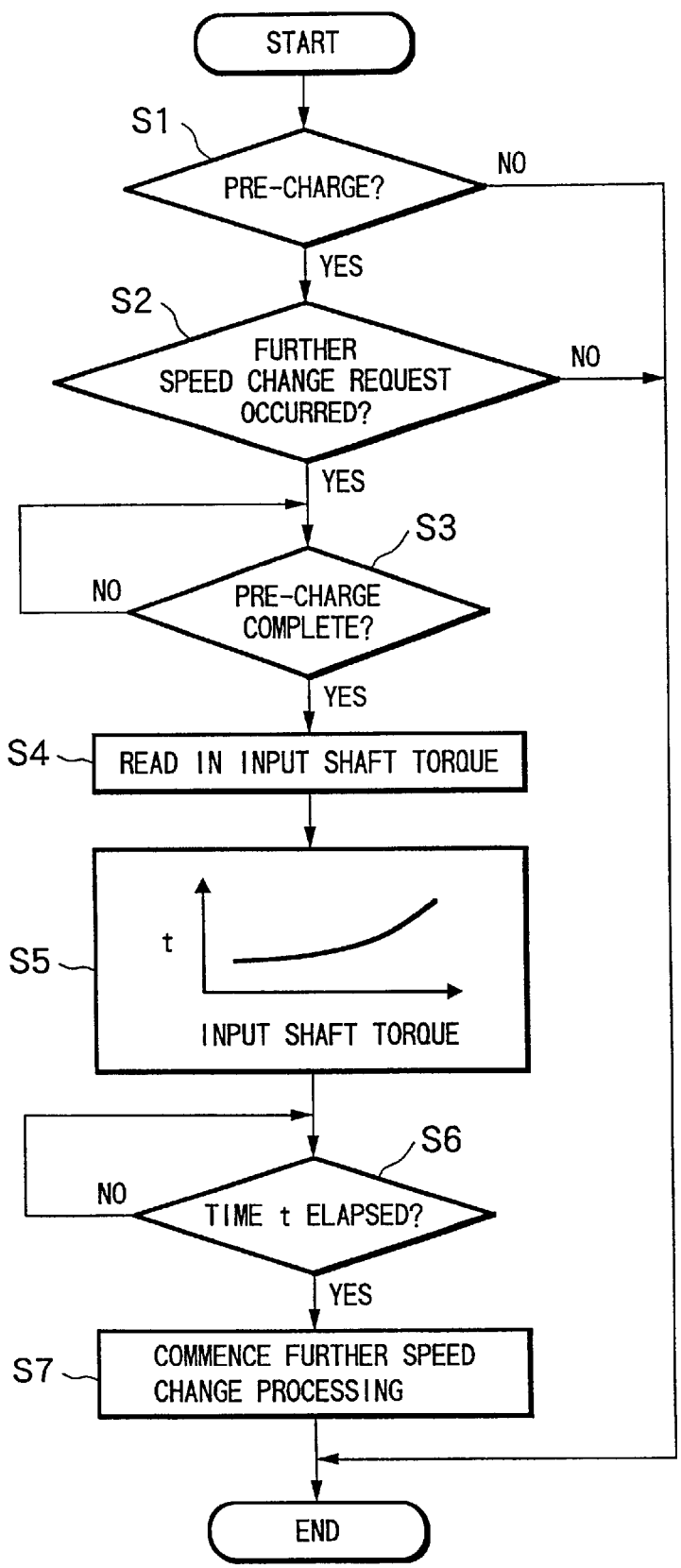
FIG. 5 is a flow chart showing a first embodiment of a control for when a different speed change request is made during pre-charging.

In the flow chart of FIG. 5, in step S1, it is judged if the pre-charge is being performed on the friction engagement element.

If the pre-charge is being performed, control proceeds to step S2 where it is judged if the further speed change request has occurred.

This further speed change request is a speed change request different from a speed change request which triggered a pre-charge control.

For example, this further speed change request is a speed change request which requires to modify the pre-charge control rather than continuing with the pre-charge control up until then, in the case where after commencement of the pre-charge in accordance with an up-shift request, conversely a down-shift request occurs, so that engagement of the friction engagement element being pre-charged is cancelled, or in the case where the engagement speed of the friction engagement element being pre-charged is to be changed even faster.

If the further speed change request occurs during pre-charging, control proceeds to step S3, and stands by until the pre-charge control is terminated.

Furthermore, an input shaft torque of a speed change mechanism is detected in step S4, and corresponding to this, a time t is set in step S5. Then in step S6, it is judged if this time t has elapsed from the termination of the pre-charge control.

Then, once the time t has elapsed, control proceeds to step S7, where a speed change processing (control of the indicated oil pressure) is commenced based on the further speed change request.

The further speed change processing is a processing for a gradual reduction of the indicated oil pressure in the case of canceling the engagement of the friction engagement element being pre-charged, while this is a processing for a gradual increase of the indicated oil pressure in the case of a modification to the sudden engagement.

In the aforementioned step S4, an engine output torque is estimated for example from the load and the rotational speed of the engine 1, and the engine output torque is then converted based on a torque ratio of the torque converter, to obtain the input shaft torque of the speed change mechanism.

Furthermore, in step S5, the aforementioned time t is set to a longer time, the larger the input shaft torque.

According to the abovementioned construction, even if the further speed change request occurs during pre-charging, the commencement of speed change processing based on the further speed change request is delayed until termination of the pre-charge control, and until the time t has elapsed.

Figure 6:
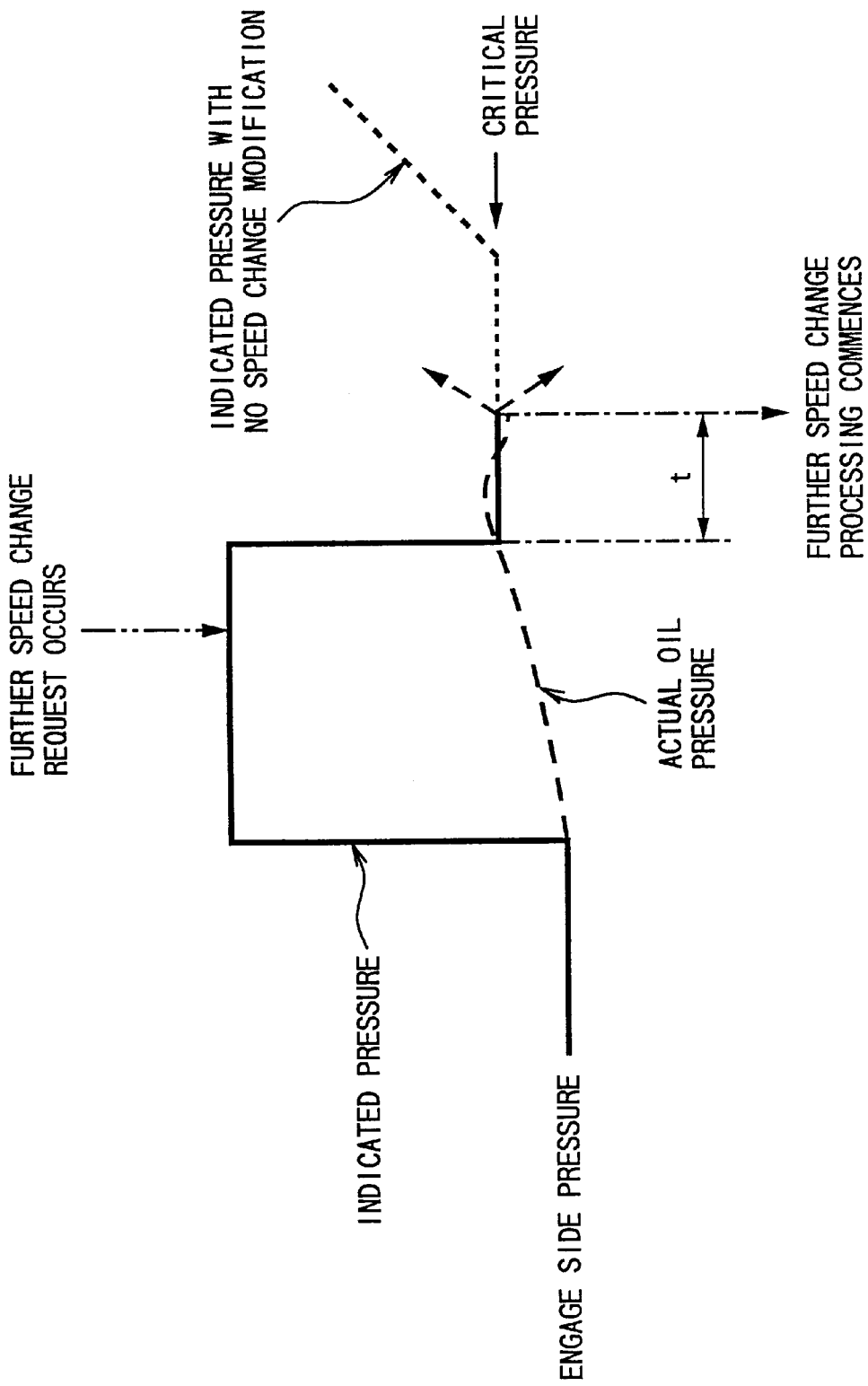
FIG. 6 is a time chart showing characteristics of a pre-charge control in the first embodiment.

While delaying the commencement of speed change processing based on the further speed change request as described above, as shown in FIG. 6, an actual oil pressure overtakes the indicated pressure, and then becomes stable at close to the indicated oil pressure.

Consequently, the speed change processing (specified oil pressure control) based on the further speed change request is commenced in a condition where the actual oil pressure and the indicated pressure approximately coincide.

As a result, in the speed change processing based on the further speed change request, the actual oil pressure (engagement condition of the friction engagement element) can be controlled in agreement with the request, by controlling the indicated pressure, so that the occurrence of a shock can be avoided.

Figure 7:
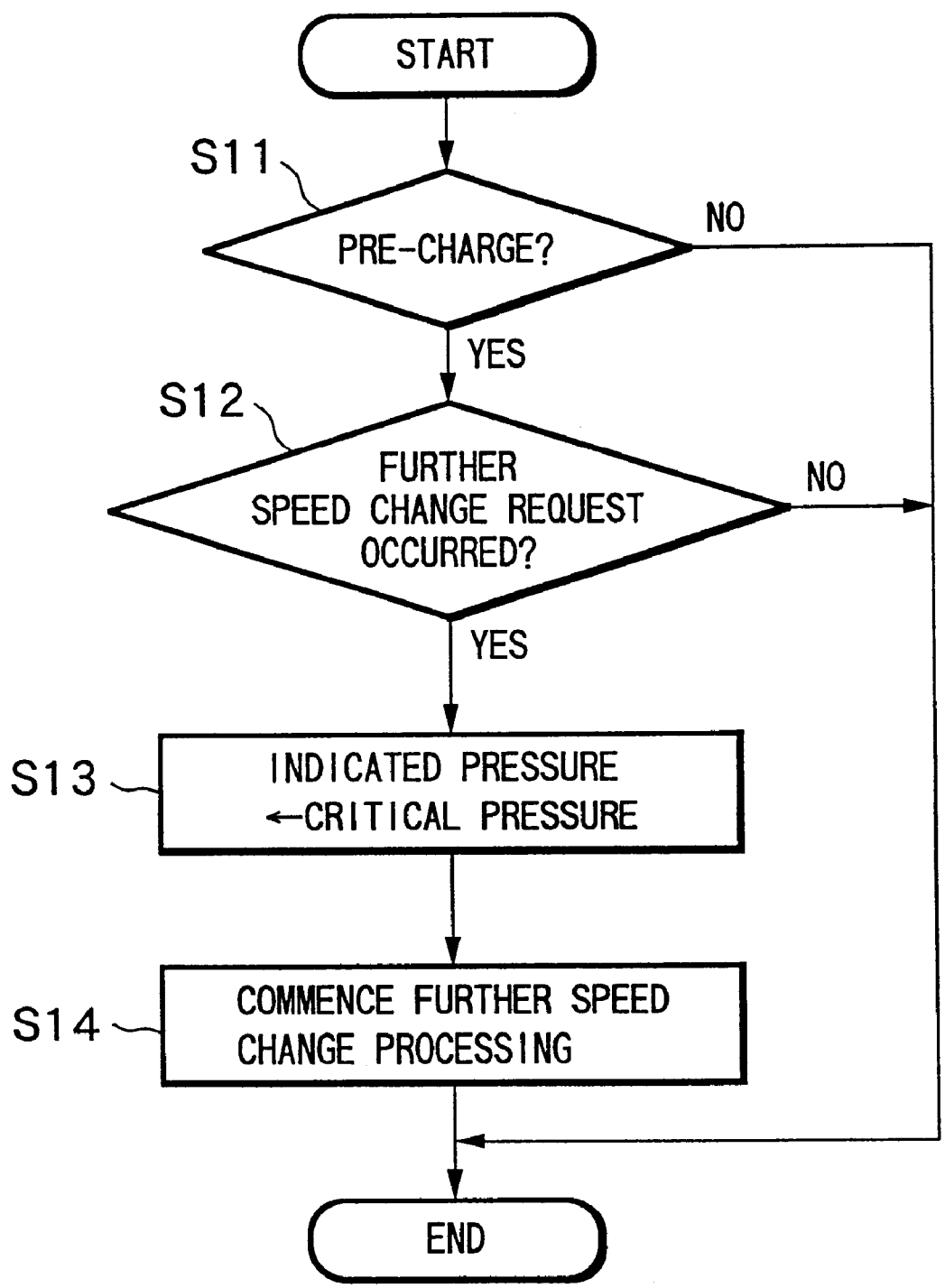
FIG. 7 is a flow chart showing a second embodiment of the control for when a different speed change request is made during pre-charging.

The flow chart of FIG. 7 shows a second embodiment of the hydraulic control for the case where the further speed change request occurs during the pre-charge control.

In the flow chart of FIG. 7, when judged in step S11 that the pre-charge is being performed on the friction engagement element, control then proceeds to step S12, and when judged that the further speed change request has occurred, control proceeds to step S13.

Figure 8:
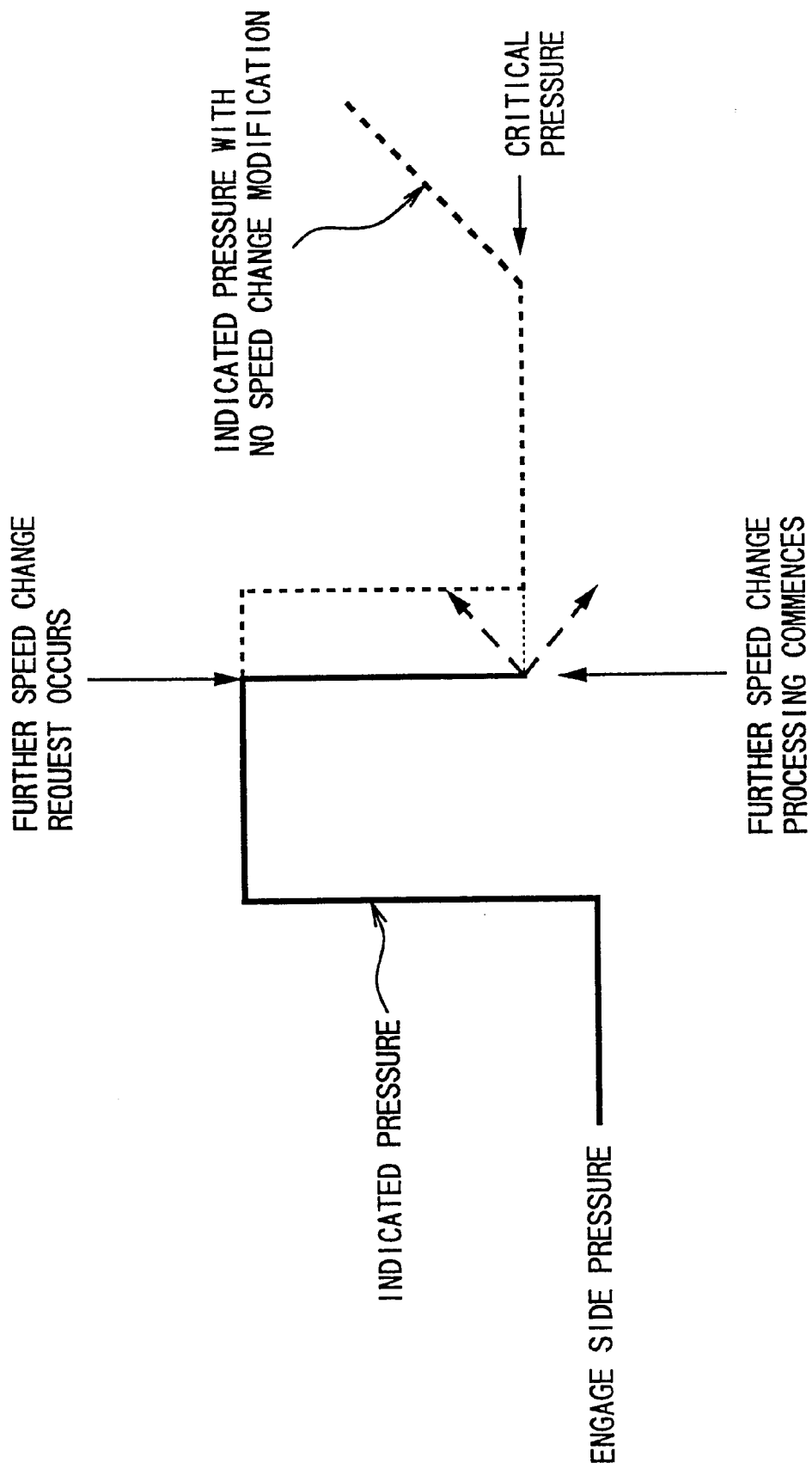
FIG. 8 is a time chart showing characteristics of a pre-charge control in the second embodiment.

In step S13, the indicated pressure is changed stepwise from the indicated pressure during the pre-charge control (pre-charge pressure) to a critical pressure equivalent to a standby pressure of the engagement control (refer to FIG. 8).

In step S14, the speed change processing based on the further speed change request is commenced, with the indicated pressure equivalent to the aforementioned critical pressure, as an initial pressure.

The pre-charge control is aimed at increasing the actual oil pressure towards the critical pressure. The pre-charge and the pre-charge pressure are determined so that the actual oil pressure approximates critical pressure when the pre-charge control is terminated, and the actual oil pressure is gradually increased towards the critical pressure.

On the other hand, since in order to perform rapid filling of oil, the pre-charge pressure is set to a value which greatly exceeds the critical pressure, then during pre-charging a difference between the actual oil pressure and the critical pressure is small compared to a difference between the indicated pressure (pre-charge pressure) and the actual oil pressure.

Consequently, when the further speed change request occurs during the pre-charge control, the processing for stepwise reducing the indicated pressure to the critical pressure, becomes the processing to make the indicated pressure approach the actual oil pressure.

If the speed change processing based on the further speed change request is commenced once the indicated pressure has come close to the actual oil pressure, then in the speed change processing based on the further speed change request, the actual oil pressure (engagement condition of the friction engagement element) can be controlled in agreement with the request, by controlling the indicated pressure, so that the occurrence of a shock can be avoided.

Furthermore, the further speed change processing can be commenced simultaneously with the occurrence of the further speed change request. Hence control conditions corresponding to the further speed change request can be quickly obtained.

In the above, the construction is such that the indicated pressure is reduced stepwise to the critical pressure. However, provided the construction is such that when the further speed change request occurs, the indicated pressure is stepwise changed to the actual oil pressure, any difference between the indicated pressure and the actual oil pressure at commencement of the processing based on the further speed change request, can be made smaller.

Figure 9:
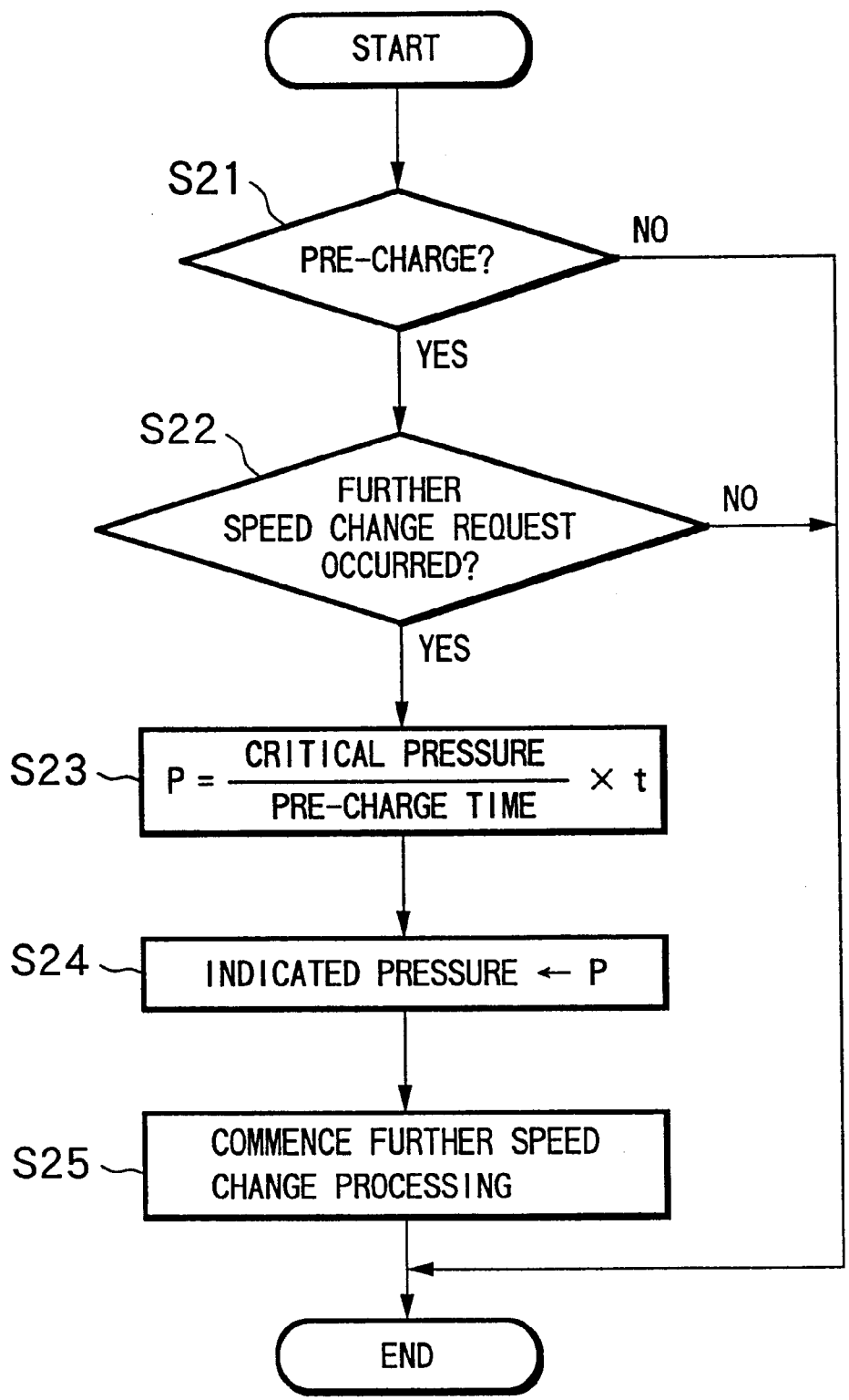
FIG. 9 is a flow chart showing a third embodiment of the control for when a different speed change request is made during pre-charging.

The flow chart of FIG. 9 shows a third embodiment which estimates the actual oil pressure during pre-charging, and in the case where the further speed change request occurs during the pre-charge control, changes stepwise the indicated pressure up to the estimated actual oil pressure.

In the flow chart of FIG. 9, when judged in step S21 that the pre-charge is performed on the friction engagement element, control then proceeds to step S22, and when judged that the further speed change request has occurred, control proceeds to step S23.

In step S23, the actual oil pressure P at that time is computed based on the following equation:

$$P = (\text{critical pressure}/\text{pre-charge time}) \times \text{elapsed time from pre-charge commencement}$$

In the pre-charge control, the pre-charge and the pre-charge pressure are determined so that the actual oil pressure approximates the critical pressure when the pre-charge control is completed.

Therefore, assuming that the rise speed of the actual oil pressure during pre-charging is constant, the rise speed becomes rise speed=critical pressure/pre-charge time, if the initial pressure is zero.

Figure 10:
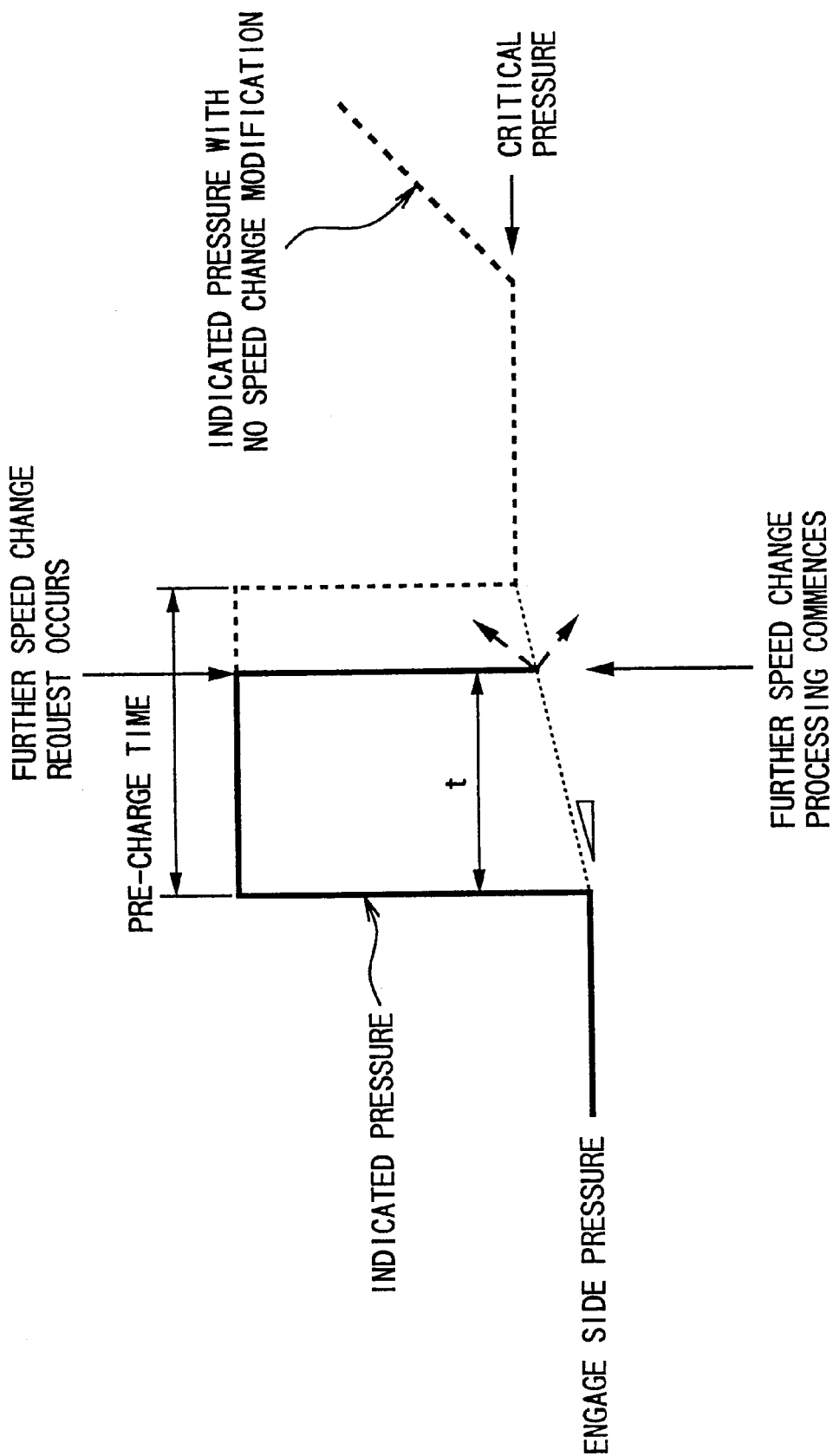
FIG. 10 is a time chart showing characteristics of a pre-charge control in the third embodiment.

Consequently, if this rise speed is multiplied by the elapsed time from commencement of the pre-charge, the actual pressure P at that time is estimated (refer to FIG. 10).

In step S24, the estimated pressure is stepwise changed from the pre-charge pressure to the actual pressure computed in step S23.

Then in step S25, the speed change processing based on the further speed change request is commenced, with the indicated pressure set close to the actual oil pressure by the processing of step S24, as the initial pressure.

As described above, with the construction where the indicated pressure is stepwise changed to the estimated actual pressure, then compared to the case where the indicated pressure is stepwise changed uniformly to the critical pressure, the difference between the indicated pressure and the actual oil pressure can be made smaller.

Incidentally, in the case where an oil pressure switch 51 is provided which is switched ON and OFF depending on whether the oil pressure in the friction engagement element is less than a reference value or equal to or more than the reference value, the estimation accuracy for the actual oil pressure can be increased by using a signal from oil pressure switch 51.

Figure 11:
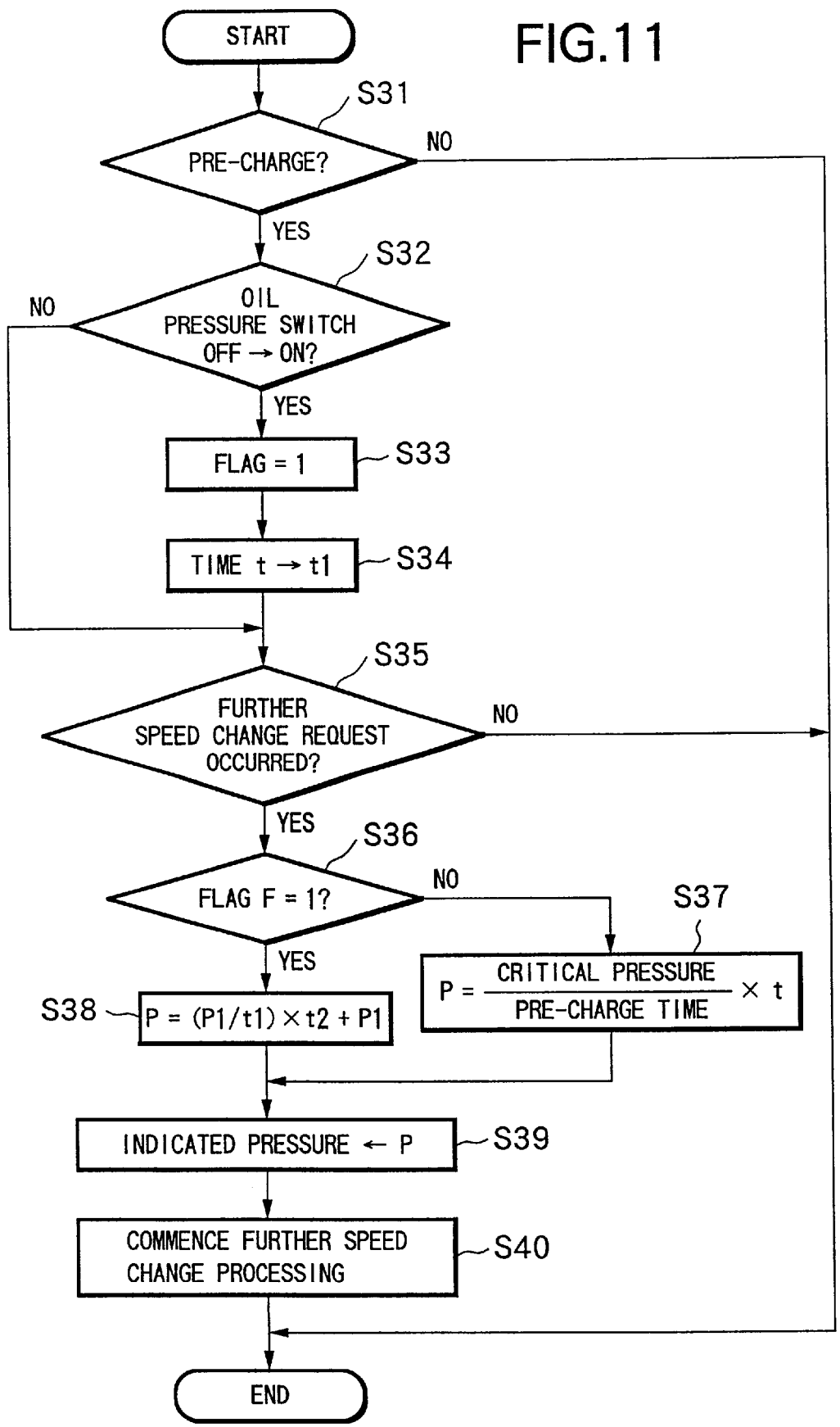
FIG. 11 is a flow chart showing a fourth embodiment of the control for when a different speed change request is made during pre-charging.

The flow chart of FIG. 11 shows a fourth embodiment for estimating the actual oil pressure using oil pressure switch 51.

In the flow chart of FIG. 11, when judged in step S31 that the pre-charge is performed on the friction engagement element, control proceeds to step S32 to judge whether or not oil pressure switch 51 has been switched from OFF to ON.

Oil pressure switch 51 is turned ON when the actual oil pressure reaches a reference pressure P1 (<critical pressure) or above, and is turned OFF when the actual oil pressure is less than the reference pressure P1.

In step S32, it is judged whether or not oil pressure switch 51 has been switched from OFF to ON.

When judged in step S32 that oil pressure switch 51 has been switched from OFF to ON, control proceeds to step S33 where 1 is set to a flag F (initial value=0).

Next, in step S34, an elapsed time from pre-charge commencement until the point in time when switching of oil pressure switch 51 from OFF to ON is detected, is stored as t1.

In step S35, it is judged whether or not the further speed change request has occurred. If judged that the further speed change request has occurred, control proceeds to step S36.

In step S36, it is judged whether or not 1 has been set to the aforementioned flag F. When the flag F is 0, control proceeds to step S37.

The condition where the flag F=0 is a condition where, from commencement of pre-charge, the actual oil pressure has not risen to the reference pressure P1 being the threshold pressure of oil pressure switch 51.

Then, at this time, as with the aforementioned step S23, the rise speed of the actual oil pressure is obtained, assuming that the actual oil pressure shall rise to the critical pressure in the pre-charge time. This rise speed is then multiplied by the elapsed time from pre-charge commencement, to estimate the actual oil pressure at that time.

On the other hand, if the flag F=1, then oil pressure switch 51 has been previously switched from OFF to ON. Therefore, control proceeds to step S38 to estimate the actual oil pressure for when the further speed change request occurred, using the timing of the switching of oil pressure switch 51.

In step S38, the actual oil pressure P is computed according to the following equation:

$$P = (P1/t1) \times \text{time after switching of the hydraulic switch } 51 + P1.$$

Figure 12:
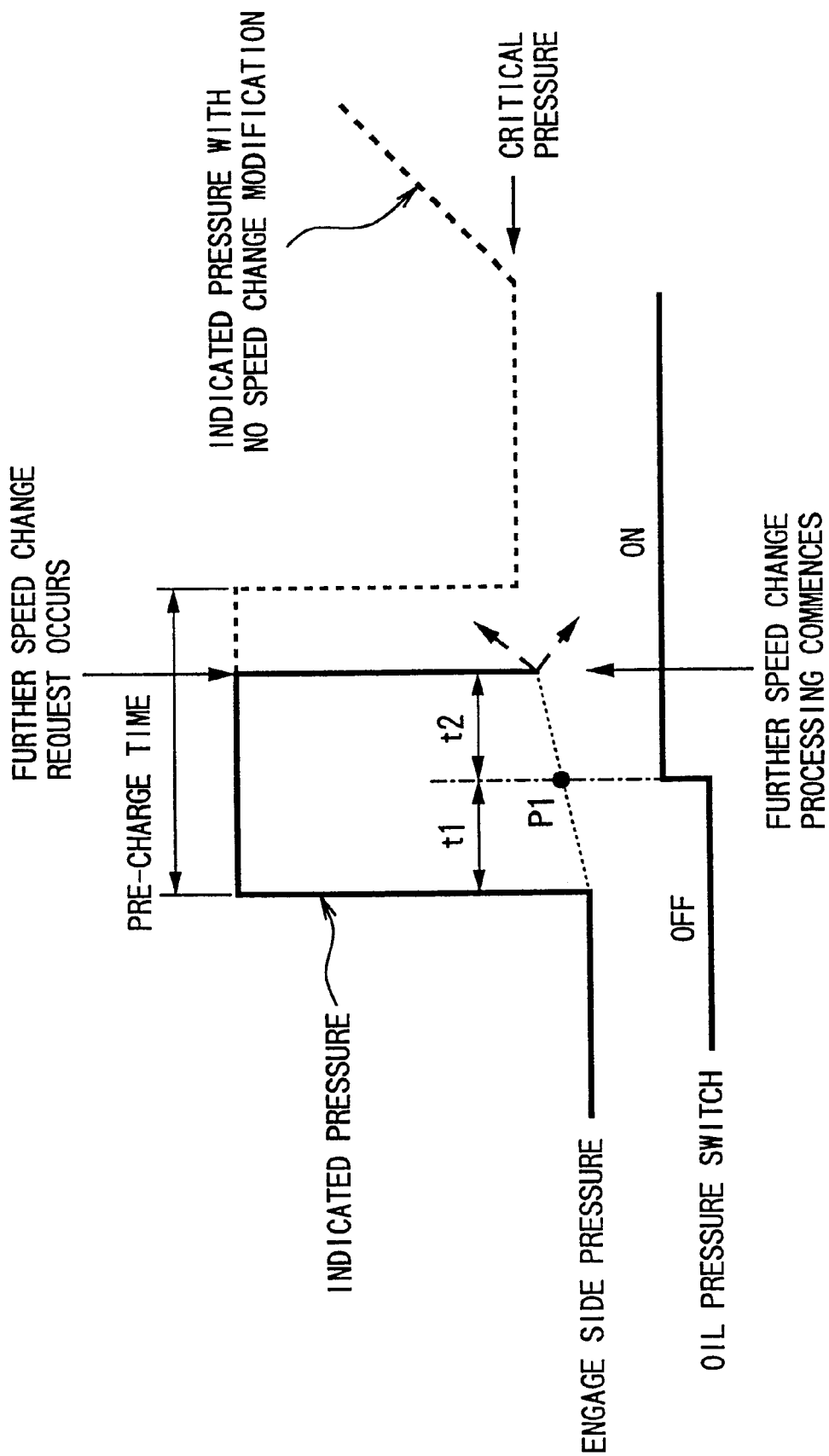
FIG. 12 is a time chart showing characteristics of a pre-charge control in the fourth embodiment.

In the above equation, as shown in FIG. 12, t1 is the time from pre-charge commencement until oil pressure switch 51 is switched. Therefore, P1/t1 is the rise speed of the actual oil pressure for the case where it is assumed that the actual oil pressure rises at a constant speed from pre-charge commencement up to P1.

Then, if this rise speed is multiplied by the time from after switching of oil pressure switch 51 until occurrence of the further speed change request, this gives an oil pressure rise amount for after switching of oil pressure switch 51, and if P1 is added to the oil pressure rise amount, this gives an estimation of the oil pressure at the point in time where the further speed change request occurs.

Once the actual oil pressure has been estimated in step S37 or step S38, control proceeds step S39 where the indicated pressure is stepwise changed to the estimated actual oil pressure, and in step S40, the speed change processing based on the further speed change request is commenced, with the indicated pressure after the stepwise change as the initial pressure.

As described above, with the construction where the rise speed of the actual oil pressure is computed from the timing for when oil pressure switch 51 is switched, the actual oil pressure can be estimated at the point in time when the further speed change request occurs corresponding to fluctuations in the rise speed. Therefore, compared to the third embodiment shown by the flow chart of FIG. 9, the indicated pressure can be made closer to the actual oil pressure.

In the above, the construction provided with oil pressure switch 51 was shown. However, in the case where there is provided an oil pressure switch 52 for detecting the actual oil pressure of the friction engagement element, the construction may be such that when the further speed change request occurs during pre-charging, the further speed change processing is commenced after stepwise changing the indicated oil pressure up to the actual oil pressure detected by oil pressure switch 52.

Figure 13:
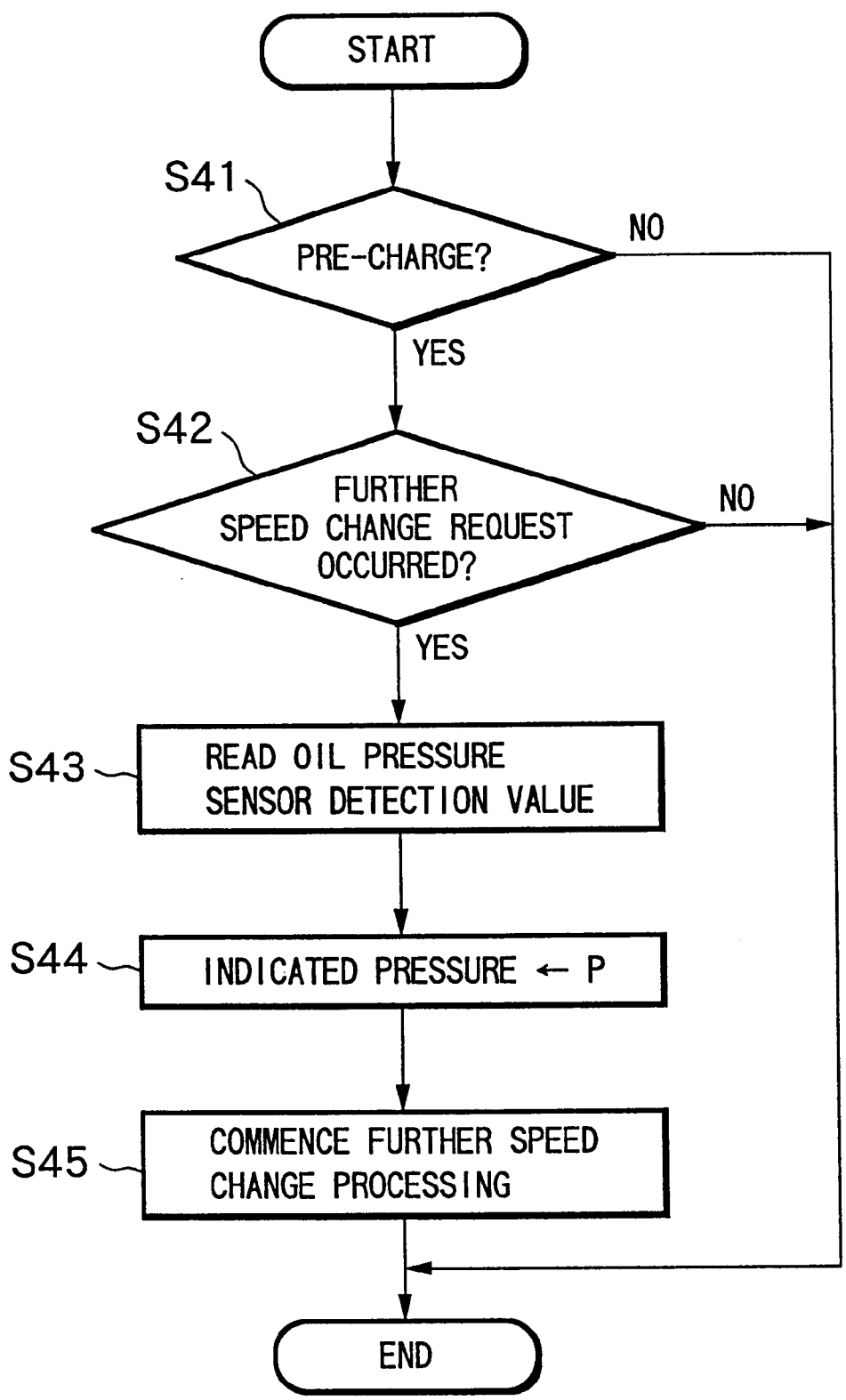
FIG. 13 is a flow chart showing a fifth embodiment of the control for when a different speed change request is made during pre-charging.

A fifth embodiment of the above construction is explained in accordance with the flow chart of FIG. 13.

In the flow chart of FIG. 13, when judged in step S41 that the pre-charge is performed on the friction engagement element, control then proceeds to step S42, and when judged that the further speed change request has occurred, control proceeds to step S43.

In step S43, the actual oil pressure detected by oil pressure switch 52 provided in the friction engagement element being pre-charged, is read in.

Figure 14:
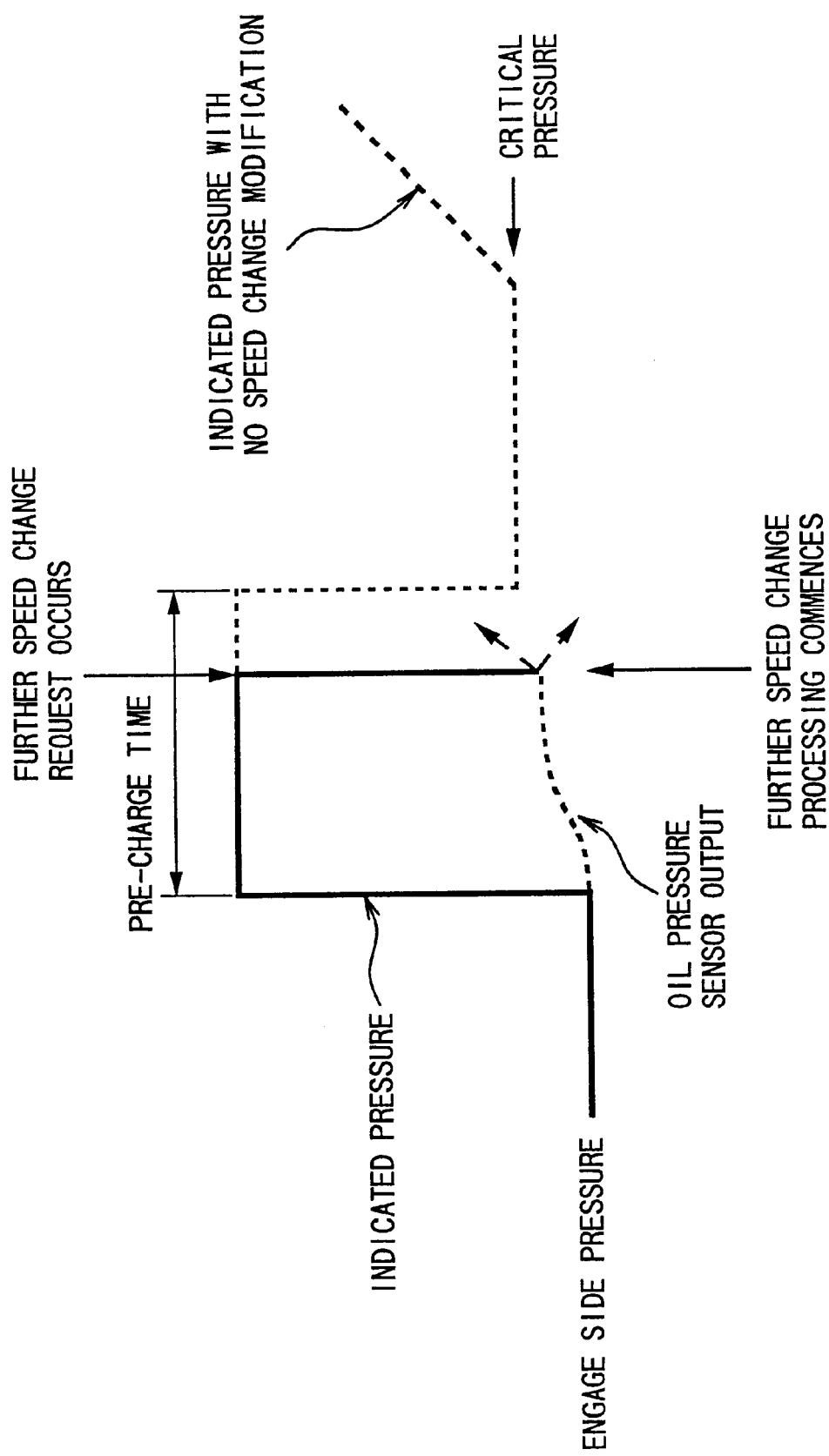
FIG. 14 is a time chart showing characteristics of a pre-charge control in the fifth embodiment

In step S44, the indicated pressure for the friction engagement element being pre-charged is stepwise changed up to the actual oil pressure read in step S43, and in step S45, the speed change processing based on the further speed change request is commenced, with the indicated pressure which has been matched to the actual oil pressure in the processing of step S44, as the initial pressure (refer to FIG. 14).

In the above, the construction is such that the indicated pressure is stepwise changed to the estimated value or detected value of the oil pressure. However the construction may be such that the indicated pressure is stepwise changed to an oil pressure for where a predetermined value is added to the estimated value or detected value of the oil pressure.

The entire contents of Japanese Patent Application No. 2000-245567, filed Aug. 14, 2000 are incorporated herein by reference.

What is claimed:

1. An apparatus for controlling oil pressure of an automatic transmission comprising:
    a valve for controlling oil pressure supply to a friction engagement element constituting an automatic transmission, and
    a controller for pre-charging oil to the friction engagement element which is engaged based on a speed change request, by controlling said valve,
    wherein, when a different speed change request occurs during a pre-charge, said controller commences a processing based on said different speed change request after performing a processing to make an indicated pressure for said friction engagement element being pre-charged approach an actual pressure in said friction engagement element.

2. An apparatus for controlling oil pressure of an automatic transmission according to claim 1,
    wherein said controller forcibly delays commencement of speed change processing based on said different speed change request, to make said indicated pressure approach the actual oil pressure, when a different speed change request occurs during said pre-charge.

3. An apparatus for controlling oil pressure of an automatic transmission according to claim 2,
    wherein said controller commences a speed change processing based on said different speed change request, after a predetermined delay time has elapsed from completion of said pre-charge.

4. An apparatus for controlling oil pressure of an automatic transmission according to claim 3, wherein said controller modifies said predetermined time in accordance with input shaft torque of a speed change mechanism.

5. An apparatus for controlling oil pressure of an automatic transmission according to claim 1,
    wherein said controller stepwise reduces the indicated pressure for the friction engagement element being pre-charged down to a reference pressure, to thereby make said indicated pressure approach an actual oil pressure, and commences a speed change processing based on said different speed change request, with said indicated pressure after stepwise change as an initial pressure, when a different speed change request occurs during said pre-charge.

6. An apparatus for controlling oil pressure of an automatic transmission according to claim 5,
    wherein said controller stores previously a standby pressure for after said pre-charge, as said reference pressure.

7. An apparatus for controlling oil pressure of an automatic transmission according to claim 5,
    wherein said controller determines said reference pressure in accordance with the actual oil pressure in said friction engagement element being pre-charged.

8. An apparatus for controlling oil pressure of an automatic transmission according to claim 7,
    wherein said controller estimates the actual oil pressure in said friction engagement element being pre-charged, based on a time from commencement of said pre-charge until a point in time when the different speed change request occurs.

9. An apparatus for controlling oil pressure of an automatic transmission according to claim 7,
    wherein there is provided an oil pressure switch which is switched when the actual oil pressure in said friction engagement element becomes a threshold value, and
    said controller estimates the actual oil pressure in said friction engagement element being pre-charged based on; a time from said pre-charge commencement until said oil pressure switch is switched, a time from when said oil pressure switch is switched until a point in time when the different speed change request occurs, and a threshold value for oil pressure in said oil pressure switch.

10. An apparatus for controlling oil pressure of an automatic transmission according to claim 7,
    wherein said controller sets the actual oil pressure at a point in time when said different speed change request occurs, as said reference pressure.

11. A method of controlling oil pressure of an automatic transmission, comprising the steps of;
    pre-charging oil to a friction engagement element which is engaged based on a speed change request,
    judging occurrence of a different speed change request during said pre-charging, making an indicated pressure for said friction engagement element being pre-charged approach an actual oil pressure in said friction engagement element when a different speed change request occurs, and commencing a processing based on said different speed change request after the processing to make said indicated pressure approach the actual oil pressure.

12. A method of controlling oil pressure of an automatic transmission according to claim 11, wherein said step of making the indicated pressure approach the actual oil pressure includes the following step of;

forcibly delaying commencement of speed change processing based on a different speed change request when said different speed change request occurs during said pre-charge.

13. A method of controlling oil pressure of an automatic transmission according to claim 12, wherein said step of delaying commencement of speed change processing includes the following steps of;

measuring an elapse of a predetermined delay time from completion of said pre-charge, and commencing the speed change processing based on said different speed change request after a point in time when said delay time has elapsed.

14. A method of controlling oil pressure of an automatic transmission according to claim 13, wherein said step of measuring delay time includes the following steps of;

detecting input shaft torque of a speed change mechanism, and setting said delay time in accordance with said input shaft torque.

15. A method of controlling oil pressure of an automatic transmission according to claim 11, wherein said step of making the indicated pressure approach the actual oil pressure includes the following steps of;

setting a reference pressure for an indicated pressure for said friction engagement element being pre-charged, and stepwise reducing the indicated pressure for the friction engagement element being pre-charged down to said reference pressure, when a different speed change request occurs during said pre-charge.

16. A method of controlling oil pressure of an automatic transmission according to claim 15, wherein said step of setting said reference pressure includes the following steps of;

storing previously a standby pressure for after said pre-charge, and setting said standby pressure as said reference pressure.

17. A method of controlling oil pressure of an automatic transmission according to claim 15, wherein said step of setting said reference pressure includes the following steps of;

detecting the actual oil pressure in said friction engagement element being pre-charged, and determining said reference pressure in accordance with said actual oil pressure.

18. A method of controlling oil pressure of an automatic transmission according to claim 17, wherein said step of detecting an actual oil pressure includes the following steps of;

measuring a time from commencement of said pre-charge until a point in time when the different speed change request occurs, and estimating said actual oil pressure based on said measured time.

19. A method of controlling oil pressure of an automatic transmission according to claim 17, wherein said step of detecting the actual oil pressure includes the following steps of;

measuring a time from said pre-charge commencement until ON/OFF switching of an oil pressure switch which is switched when the actual oil pressure in said friction engagement element becomes a threshold value, measuring a time from ON/OFF switching of said oil pressure switch until the different speed change request occurs, and estimating the actual oil pressure in said friction engagement element being pre-charged based on said measured time and said threshold value for the oil pressure switch.

20. A method of controlling oil pressure of an automatic transmission according to claim 17, wherein said step of determining said reference pressure in accordance with the actual oil pressure includes the following steps of;

detecting the actual oil pressure at a point in time when said different speed change request occurs, and setting said actual oil pressure at the point in time when said different speed change request occurs, as said reference pressure.

* * * * *